United States Patent
Kim et al.

(10) Patent No.: US 12,327,866 B2
(45) Date of Patent: Jun. 10, 2025

(54) ELECTRODE STRUCTURE, POSITIVE ELECTRODE AND ELECTROCHEMICAL DEVICE INCLUDING THE SAME, AND METHOD OF PREPARING THE ELECTRODE STRUCTURE

(71) Applicant: SAMSUNG ELECTRONICS CO., LTD., Suwon-si (KR)

(72) Inventors: Kyounghwan Kim, Seoul (KR); Hwiyeol Park, Hwaseong-si (KR); Jeongkuk Shon, Hwaseong-si (KR); Huisu Jeong, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 292 days.

(21) Appl. No.: 17/530,554

(22) Filed: Nov. 19, 2021

(65) Prior Publication Data
US 2022/0181617 A1    Jun. 9, 2022

(30) Foreign Application Priority Data
Dec. 7, 2020  (KR) .................. 10-2020-0169843

(51) Int. Cl.
*H01M 4/525*   (2010.01)
*H01M 4/04*    (2006.01)
(Continued)

(52) U.S. Cl.
CPC ......... *H01M 4/525* (2013.01); *H01M 4/0404* (2013.01); *H01M 4/0471* (2013.01);
(Continued)

(58) Field of Classification Search
CPC .. H01M 4/525; H01M 4/0404; H01M 4/0471; H01M 4/505; H01M 4/623;
(Continued)

(56) References Cited

U.S. PATENT DOCUMENTS 7,846,579 B2  12/2010  Krasnov et al.
8,192,789 B2   6/2012  Albano et al.
(Continued)

FOREIGN PATENT DOCUMENTS

JP   2000164256 A   6/2000
JP   2010212161 A   9/2010
(Continued)

OTHER PUBLICATIONS

Extended European Search Report issued Apr. 22, 2022 of EP Patent Application No. 21212572.8.
(Continued)

*Primary Examiner* — Matthew T Martin
*Assistant Examiner* — Bartholomew A Hornsby
(74) *Attorney, Agent, or Firm* — CANTOR COLBURN LLP

(57) ABSTRACT

An electrode structure, a positive electrode and an electrochemical device including the same, and a method of preparing the electrode structure. The electrode structure includes a current collector; and an electrode active material layer on a surface of the current collector, wherein the electrode active material layer includes an electrode active material and an opening penetrating through the electrode active material layer; and a conductive layer comprising a conductive material and a binder on an inner surface of the opening, and wherein the content of the conductive material and the binder is 0.05% to 3% by weight on the basis of the total weight of the electrode active material layer.

33 Claims, 9 Drawing Sheets

(51) Int. Cl.
*H01M 4/505* (2010.01)
*H01M 4/62* (2006.01)

(52) U.S. Cl.
CPC .......... *H01M 4/505* (2013.01); *H01M 4/623* (2013.01); *H01M 4/625* (2013.01); *H01M 4/626* (2013.01)

(58) Field of Classification Search
CPC ...... H01M 4/625; H01M 4/626; H01M 4/131; H01M 4/1391; H01M 4/366; H01M 4/624; H01M 10/0525
See application file for complete search history.

(56) References Cited

U.S. PATENT DOCUMENTS

| | | | |
|---|---|---|---|
| 8,597,722 B2 | 12/2013 | Albano et al. | |
| 8,900,743 B2 | 12/2014 | Kim et al. | |
| 9,012,084 B2 | 4/2015 | Yada et al. | |
| 9,065,093 B2 | 6/2015 | Chiang et al. | |
| 9,379,375 B2 | 6/2016 | Sugiura et al. | |
| 9,425,454 B2 | 8/2016 | Sugiura et al. | |
| 11,296,325 B2 | 4/2022 | Kim et al. | |
| 11,984,588 B2 * | 5/2024 | Sasakawa | B60L 50/64 |
| 2003/0231004 A1 * | 12/2003 | Takahashi | H01M 4/0409 320/117 |
| 2007/0259271 A1 | 11/2007 | Nanno et al. | |
| 2010/0173204 A1 | 7/2010 | Sugiura et al. | |
| 2012/0009470 A1 * | 1/2012 | Sugiura | C01G 51/50 429/211 |
| 2012/0009471 A1 | 1/2012 | Sugiura et al. | |
| 2012/0135292 A1 | 5/2012 | Buckingham et al. | |
| 2016/0204464 A1 | 7/2016 | Cho et al. | |
| 2016/0204477 A1 | 7/2016 | Yang et al. | |
| 2017/0040607 A1 | 2/2017 | Cho et al. | |
| 2017/0047582 A1 | 2/2017 | Park et al. | |
| 2017/0084918 A1 | 3/2017 | Yang et al. | |
| 2017/0256777 A1 * | 9/2017 | Akikusa | H01M 4/58 |
| 2018/0013119 A1 | 1/2018 | Yang et al. | |
| 2020/0161642 A1 | 5/2020 | Park et al. | |
| 2021/0091370 A1 * | 3/2021 | Yamada | H01M 4/463 |
| 2021/0091419 A1 | 3/2021 | Kim et al. | |
| 2022/0173402 A1 * | 6/2022 | Jang | H01G 11/28 |
| 2022/0293963 A1 | 9/2022 | Jeong et al. | |

FOREIGN PATENT DOCUMENTS

| | | | |
|---|---|---|---|
| JP | 2012038528 A * | 2/2012 | |
| JP | 2012099405 A | 5/2012 | |
| JP | 5564649 B2 | 7/2014 | |
| JP | 5587052 B2 | 9/2014 | |
| JP | 2014220042 A * | 11/2014 | |
| JP | 6316066 B2 * | 4/2018 | |
| JP | 2019175604 A | 10/2019 | |
| KR | 1020120054143 A | 5/2012 | |
| KR | 1020180025685 A | 3/2018 | |
| KR | 102044692 B1 | 11/2019 | |
| WO | 2006064774 A1 | 6/2006 | |

OTHER PUBLICATIONS

Yuyuan Jiang et al., "Atomistic mechanism of cracking degradation at twin boundary of $LiCoO_2$," Nano Energy, Sep. 11, 2020, pp. 1-10, vol. 78, No. 105364.

* cited by examiner

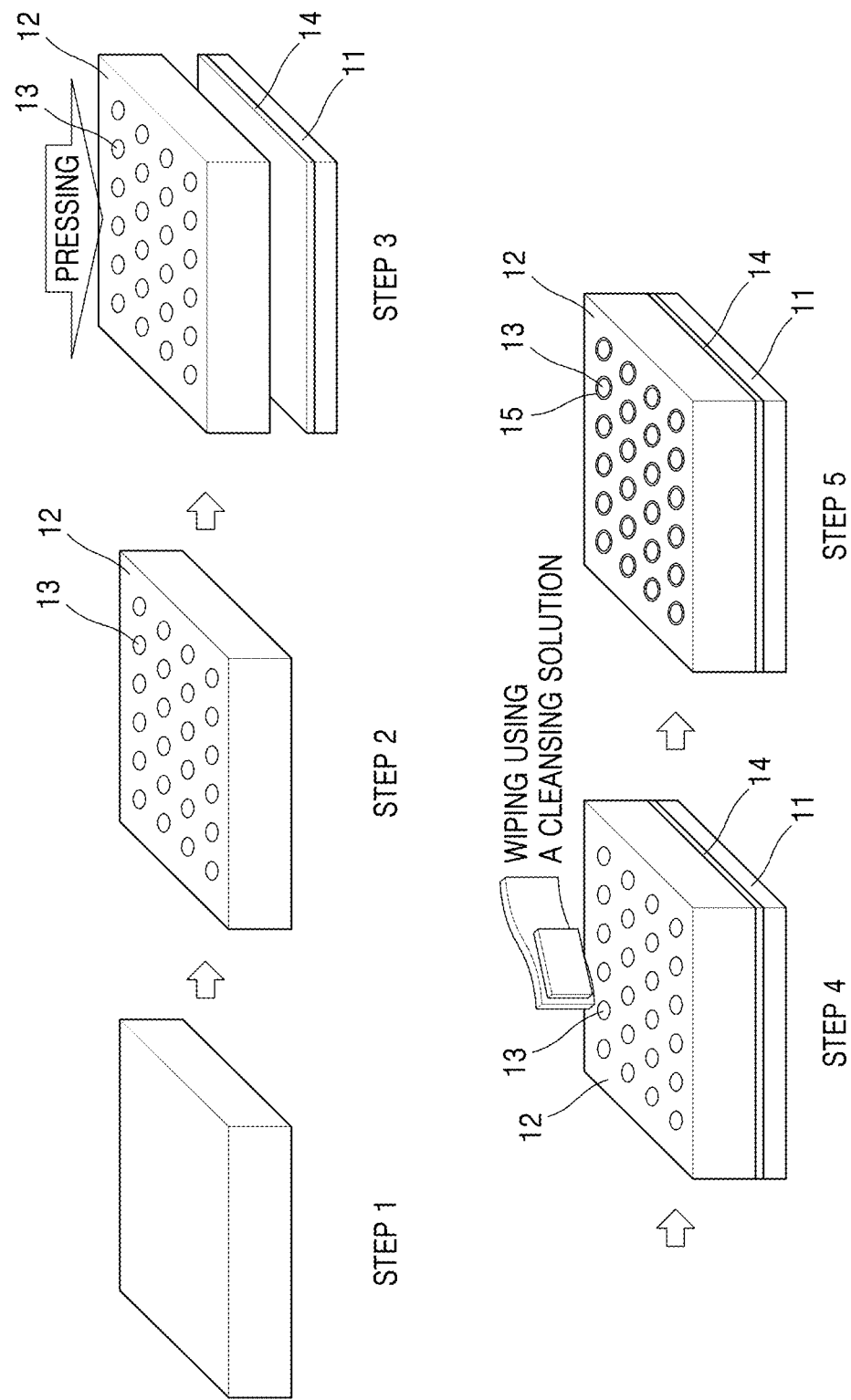

ELECTRODE STRUCTURE, POSITIVE ELECTRODE AND ELECTROCHEMICAL DEVICE INCLUDING THE SAME, AND METHOD OF PREPARING THE ELECTRODE STRUCTURE

CROSS-REFERENCE TO RELATED APPLICATION

This application claims priority to and the benefit of Korean Patent Application No. 10-2020-0169843, filed on Dec. 7, 2020, in the Korean Intellectual Property Office, and all the benefits accruing therefrom under 35 U.S.C. § 119, the content of which in its entirety is herein incorporated by reference.

BACKGROUND

1. Field

The present disclosure relates to electrode structures, positive electrodes and electrochemical devices including the same, and methods of preparing the electrode structures.

2. Description of the Related Art

Extensive research has been conducted to develop electrodes with high energy density for electrochemical devices, for example, lithium secondary batteries. Studies on sintered electrodes have been conducted as electrodes having high energy density. Unlike electrodes prepared by using an electrode active material slurry, sintered electrode active material layers may not include a binder, a conductive material, or a combination thereof, and a sintered electrode active material layers may be bonded to a current collector.

However, when the sintered body is bonded and fixed to the current collector, cracks may be created between grains of an electrode active material of a lithium second battery including the same during charge and discharge, which may result in creation of resistance and deterioration of battery performance such as capacity decrease.

Therefore, there is a need to develop electrode structures having high energy density and capable of enhancing high-rate and lifespan characteristics, positive electrodes and electrochemical devices including the same, and methods of preparing the electrode structures.

SUMMARY

Provided are electrode structures having high energy density and capable of enhancing high-rate and lifespan characteristics.

Provided are positive electrodes including the electrode structures.

Provided are electrochemical devices including the positive electrodes.

Provided are methods of preparing the electrode structures.

Additional aspects will be set forth in part in the description which follows and, in part, will be apparent from the description, or may be learned by practice of the presented embodiments of the disclosure.

According to an embodiment, an electrode structure includes:
a current collector; and
an electrode active material layer on a surface of the current collector,
wherein the electrode active material layer includes an electrode active material and an opening penetrating through the electrode active material layer; and
a conductive layer comprising a conductive material and a binder on an inner surface of the opening, and
wherein the content of the conductive material and the binder is 0.05% to 3% by weight on the basis of the total weight of the electrode active material layer, According to an embodiment,
a positive electrode includes the disclosed electrode structure.

According to an embodiment, an electrochemical device includes:
the disclosed positive electrode;
a negative electrode; and
an electrolyte interposed between the positive electrode and the negative electrode.

According to an embodiment, a method of preparing an electrode structure includes:
providing an electrode active material composition;
coating the electrode active material composition on a substrate;
heating the electrode active material composition to prepare an electrode active material layer;
forming an opening penetrating through the electrode active material layer;
coating a conductive bonding layer composition on a current collector to form a coated current collector; and
press-bonding the electrode active material layer to the coated current collector to prepare a press-bonded structure including a conductive bonding layer between the current collector and the electrode active material layer and form a conductive layer on an inner surface of the opening; and
annealing the press-bonded structure to prepare the electrode structure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a flowchart schematically illustrating an embodiment of a method of preparing an electrode structure;

DETAILED DESCRIPTION

Figure 1:
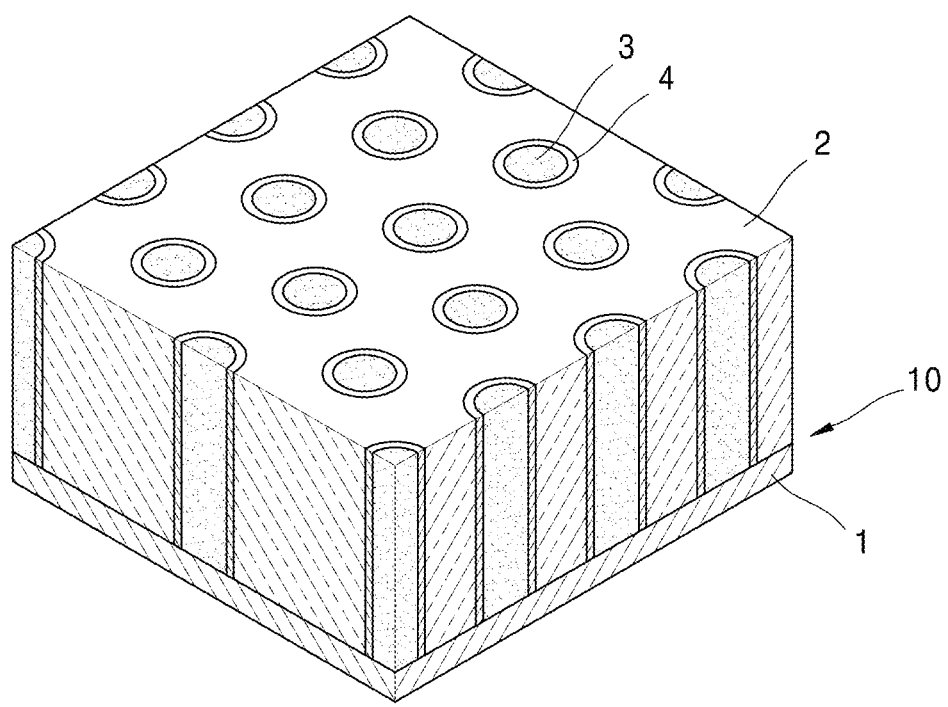
FIG. 1 is a schematic diagram illustrating an embodiment of an electrode structure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an electrode structure, a positive electrode and an electrochemical device including the electrode structure, and a method of preparing the electrode structure according to an embodiment will be described in further detail with reference the accompanying drawings. Accordingly, it should be apparent to those skilled in the art that the following description of various embodiments of the present disclosure is provided for illustration purpose only and not for the purpose of limiting the present disclosure as defined by the appended claims and their equivalents.

Expressions such as "at least one of" or "one or more", when preceding a list of elements, modify the entire list of elements and do not modify the individual elements of the list. As used herein, the term "combination" includes a mixture or a composite of one component and another unless otherwise stated.

Throughout the specification, the term "include" in relation to an element does not preclude other elements but may further include another element, unless otherwise stated.

As used herein, terms "first", "second", and the like are used to distinguish one component from another, without indicating order, quantity, or importance. An expression used in the singular, such as "a" or "an," encompasses the expression of the plural, unless otherwise indicated or it has a clearly different meaning in the context. The term "or" refers to "and/or" unless otherwise stated.

As used herein, the terms "an embodiment", "embodiments", and the like indicate that elements described with regard to an embodiment are included in at least one embodiment described in this specification and may or may not present in other embodiments. In addition, it may be understood that the described elements are combined in any suitable manner in various embodiments.

Unless otherwise defined, technical and scientific terms used herein have the same meaning as commonly understood by one or ordinary skill in the art to which this application belongs. All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

It will be understood that when an element is referred to as being "on" another element, it can be directly on the other element or intervening elements may be present therebetween. In contrast, when an element is referred to as being "directly on" another element, there are no intervening elements present.

Furthermore, relative terms, such as "lower" and "upper," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, a C-rate means a current which will discharge a battery in one hour, e.g., a C-rate for a battery having a discharge capacity of 1.6 ampere-hours would be 1.6 amperes.

When a sintered electrode active material layer, as a high-density electrode structure, is bonded and fixed to a current collector, interface resistance may be created by cracks formed between grains of an electrode active material of an electrochemical device including the same during charge and discharge. Such interface resistance of the electrode may result in non-uniform charging and discharging between the grains of the electrode active material. Non-uniform volume changes occurring between the grains of the electrode active material may cause loss of the electrode active material, and the performance of an electrochemical device including the sintered electrode active material layer may be impaired, for example, capacity thereof may decrease.

In order to solve these problems, provided are an electrode structure, a positive electrode and an electrochemical device including the same, and a method of preparing the electrode structure.

Hereinafter, the electrode structure, the positive electrode and the electrochemical device including the same, and the method of preparing the electrode structure will be described in further detail.

Electrode Structure

An electrode structure according to an embodiment includes: a current collector; and an electrode active material layer, e.g., a sintered plate electrode active material layer, located on a surface of the current collector, wherein the electrode active material layer includes an electrode active material and an opening, e.g., a hole, crack, or a combination thereof, penetrating though the sintered plate electrode active material layer; and a conductive layer, e.g., a conductive thin-film layer, comprising a conductive material and a binder on an inner surface of the opening, wherein the content of the conductive material, and the binder is 0.05% to 3% by weight on the basis of the total weight of the electrode active material layer.

The content of the conductive material, and the binder may be greater than or equal to 0.05%, 0.1%, 0.3%, or 0.5% by weight on the basis of the total weight of the electrode active material layer. The content of the conductive material, and the binder may be less than or equal to 3%, 2.5%, 2%, 1.5%, or 1% by weight on the basis of the total weight of the electrode active material layer.

The content of the conductive material and the binder is at most 0.01% by weight on the basis of the total weight of the electrode active material layer in at least 90% of the electrode active material area that is not adjacent to the conductive layer. The content of the conductive material and the binder is at most 0.01% by weight on the basis of the total weight of the electrode active material layer in at least 91%, 92%, 93%, 94%, 95%, 96%, 97%, 98%, 99%, or 99.9% of the electrode active material area that is not adjacent to the conductive layer. As used herein, "the electrode active material area that is not adjacent to the conductive layer" refers to the electrode active material areas other than a conductive layer. For example, "the electrode active material area that is not adjacent to the conductive layer" refers to the electrode active material areas other than a conductive thin-film layer coated on an inner surface of the opening.

The solid content of the electrode active material layer may be 25% to 98% by volume. As used herein, "the solid content of the electrode active material layer" refers to a content of an electrode active material. The solid content of the electrode active material layer may be greater than or equal to 25%, 30%, 35%, 40%, 45%, 50%, 55%, 60%, 65%, 70%, 75%, 80%, 85%, 90%, 92%, or 95% A by volume. The solid content of the electrode active material layer may be less than or equal to 98% or 97% by volume.

The opening may penetrate the electrode active material layer and extends from the surface of the electrode active material layer facing the current collector to an opposite surface. In an aspect, the sintered plate electrode active material layer may have a hole, crack, or a combination thereof vertically penetrating the sintered plate electrode active material layer from one surface facing the current collector to the other.

As used herein, the terms "one surface" and "the other" refer to a surface perpendicular or substantially perpendicular to a thickness direction of the sintered plate electrode active material layer and the opposite surface. Throughout the specification, a shape of the cross-section of the hole is not limited to a circle. For example, the cross-section of the holes may have any of various suitable shapes such as a circle, an oval, a triangle, a square, a pentagon, or a hexagon.

The crack refers to a gap having a substantially uniform interval. The crack is distinguished from a non-uniform crack formed between electrode active materials during charge and discharge. The penetrating may refer to penetrating in one direction. The penetrating direction may include either a vertical or substantially vertical direction, a diagonal direction, or a combination thereof.

Stated otherwise, the electrode active material layer includes an opening (e.g., hole, crack, or combination thereof) penetrating through the electrode active material layer. As used herein, "through the electrode active material layer" means that the opening penetrates the electrode active material layer from one surface to an opposite surface of the electrode active material layer.

FIG. 1 is a schematic diagram illustrating an electrode structure according to an embodiment.

As shown in FIG. 1, an electrode structure 10 includes a current collector 1 and a sintered plate electrode active material layer 2 located on a surface of the current collector 1. By the electrode structure 10, as a loading amount of an electrode active material in the electrode increases in an electrode, the energy density of the electrode may be increased. The sintered plate electrode active material layer 2 has a plurality of holes 3 penetrating the sintered plate electrode active material layer 2 from one surface to an opposite surface thereof. Specifically, the sintered plate electrode active material layer 2 has the plurality of holes 3 that vertically penetrate the sintered plate electrode active material layer 2 from one surface facing the current collector 1 to the other surface. The sintered plate electrode active material layer 2 may provide lithium secondary batteries having excellent rate characteristics. The hole 3 includes a conductive thin-film layer 4 formed on the inner wall thereof. The conductive thin-film layer 4 may prevent concentration of current by forming a passage through which electrons move smoothly. In addition, the conductive thin-film layer 4 may prevent cracks from forming between grains constituting the electrode active material during charge and discharge by strengthening linkage between the grains. The electrode structure 10 may thus have high energy density and provide an electrochemical device having enhanced high-rate and lifespan characteristics due to reduced resistance of the electrode.

The sintered plate electrode active material layer 2 may have a thickness of about 30 micrometers ($\mu$m) or greater. For example, the thickness of the sintered plate electrode active material layer 2 may be in the range of about 30 $\mu$m to about 200 $\mu$m, for example, about 31 $\mu$m to about 150 $\mu$m, about 32 $\mu$m to about 125 $\mu$m, about 33 $\mu$m to about 100 $\mu$m, about 34 $\mu$m to about 75 $\mu$m, or about 35 $\mu$m to about 50 $\mu$m. When the thickness of the sintered plate electrode active material layer 2 is within the disclosed range, deterioration of battery performance such as a capacity of the battery may occur during charge and discharge. Therefore, the effects of the disclosed electrode structure on improving rate characteristics and lifespan characteristics may be effectively obtained. The sintered plate electrode active material layer 2 may include two or more layers.

The sintered plate electrode active material layer 2 may include a lithium transition metal oxide. The lithium transition metal oxide may be any suitable lithium transition metal oxides. For example, the lithium transition metal oxide may be a composite oxide of lithium and a metal such as cobalt, manganese, nickel, or a combination thereof. Examples of the composite oxide include compounds represented by the following formulae: $Li_aA_{1-b}B'_bD'_2$ (where $0.90 \leq a \leq 1$ and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB'_cO_{2-\alpha}F''_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 \leq \alpha \leq 2$); $Li_aN_{i_b}E_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is Ni, Co, Mn, or a combination thereof; B' is Al, Ni, Co, Mn, Cr, Fe, Mg, Sr, V, a rare earth element, or a combination thereof; D' is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

For example, the lithium transition metal oxide may include $LiCoO_2$, $Li(Ni_bCo_cMn_d)O_2$ (where $0 < b \leq 0.9$, $0 < c \leq 0.5$, $0 < d \leq 0.5$, and $b+c+d=1$), $Li(Ni_bCo_cAl_e)O_2$ (where $0 < b \leq 0.9$, $0 < c \leq 0.5$, $0 < e \leq 0.1$, and $b+c+e=1$), $LiMn_2O_4$, or $LiFePO_4$.

The compounds listed above may have a coating layer on the surface thereof. A mixture of a compound listed above not having a coating layer and a compound listed above having a coating layer may be used. The coating layer may include a compound of a coating element such as an oxide, hydroxide, oxyhydroxide, oxycarbonate, or hydroxycarbonate of the coating element. The compound constituting the coating layer may be amorphous or crystalline. The coating element contained in the coating layer may be Mg, Al, Co, K, Na, Ca, Si, Ti, V, Sn, Ge, Ga, B, As, Zr, or a combination thereof. A method of forming the coating layer may be any suitable method (for example, spray coating or dip coating) and should not adversely affect the physical properties of a positive active material when a compound of such a coating element is used.

If desired, the sintered plate electrode active material layer 2 may prepared by further adding a dispersing agent, a binder, a plasticizer, a solvent, and the like thereto and mixing the components. Examples of the dispersing agent may include toluene, isopropanol, and N-methyl pyrrolidone ("NMP"). Examples of the binder may include polyvinylidene fluoride or polyvinyl butyral. Examples of the plasticizer may include di(2-ethylhexyl)phthalate. Examples of the solvent may include a NMP. However, the embodiment is not limited thereto, and any suitable dispersing agents, binders, plasticizers, solvents, and the like may be used.

The opening, e.g., hole or crack, may be a channel allowing migration of lithium ions. The electrode structure 10 including the same may improve high-rate characteristics. When the holes or cracks are vertically aligned, e.g., substantially perpendicular to the surface of the electrode active material layer, an electrochemical device including the same may have improved high-rate characteristics.

The conductive thin-film layer 4 may have a thickness of about 0.1 nanometers (nm) to about 10 μm, for example, about 0.5 nm to about 8 μm, about 1 nm to about 6 μm, about 25 nm to about 4 μm, about 50 nm to about 2 μm, or about 100 nm to about 1 μm. When the thickness of the conductive thin-film layer 4 is within the disclosed range, concentration of current and local overcharging may be prevented during charge and discharge, and thus high-rate and lifespan characteristics of the electrochemical device may be improved.

The conductive thin-film layer 4 may include a conductive material and a binder.

The conductive material may include a carbonaceous material, a metallic material, a metal oxide material, or a combination thereof.

For example, the conductive material may include carbon particles, carbon fibers, or carbon tubes such as carbon black, natural graphite, artificial graphite, acetylene black, or ketjen black; metal particles, metal fibers, metal tubes, metal oxide particles, metal oxide fibers, or metal oxide tubes of copper, nickel, aluminum, cobalt, chromium, palladium, molybdenum, silver, gold, thallium, tungsten, iron, titanium, platinum, an oxide thereof, or a combination thereof; or a combination thereof.

For example, the binder may include vinylidene fluoride/hexafluoropropylene copolymer, polyvinylidene fluoride, polyacrylonitrile, polymethylmethacrylate, polytetrafluoroethylene ("PTFE"), polyamideimide, styrene butadiene, or a combination thereof.

A mixing ratio of the conductive material and the binder may be within a range suitable for uniform coating of the conductive thin-film layer 4. For example, the mixing ratio of the conductive material and the binder may be from about 4:9 to about 11:3, for example, about 4:8 to about 10:3, about 4:7 to about 9:3, or about 4:6 to about 8:3.

The current collector 1 may have a thickness of about 3 μm to about 500 μm, for example, about 4 μm to about 200 μm, about 5 μm to about 100 μm, about 6 μm to about 50 μm, about 7 μm to about 25 μm, or about 8 μm to about 20 μm. The current collector 1 should not cause chemical change in a fabricated electrochemical device and should have conductivity. For example, copper, stainless-steel, aluminum, nickel, titanium, calcined carbon, copper or stainless-steel surface-treated with carbon, nickel, titanium silver, or an aluminum-cadmium alloy may be used therefor. In addition, the current collector 1 may be processed to have irregularities on the surface thereof to enhance adhesiveness thereof to the electrode active material layer and may be used in any of various suitable forms including films, sheets, foils, nets, porous structures, foams, and non-woven fabrics.

A conductive bonding layer may further be included between the current collector 1 and the sintered plate electrode active material layer 2. The conductive bonding layer may have a thickness of about 0.1 nm to about 20 μm, for example, about 0.2 nm to about 19 μm, about 0.4 nm to about 18 μm, about 0.6 nm to about 17 μm, about 0.8 nm to about 16 μm, or about 1 nm to about 15 μm. The conductive bonding layer may include a conductive, e.g., electrically conductive, material and a binder. When the conductive bonding layer is between the current collector 1 and the sintered plate electrode active material layer 2, cracks between the grains caused by repeated charging and discharging cycles may be prevented, compared to a case in which the conductive bonding layer is not included.

The conductive bonding layer may have a composition identical to or different from that of the conductive thin-film layer 4. For example, the conductive bonding layer may have the same composition as that of the conductive thin-film layer 4.

Positive Electrode and Electrochemical Device

A positive electrode according to an embodiment may include the disclosed electrode structure.

An electrochemical device according to an embodiment may include: the disclosed positive electrode; a negative electrode; and an electrolyte between the positive electrode and the negative electrode. The electrochemical device may include a lithium battery, a capacitor, a super capacitor, or the like. For example, the electrochemical device may be a lithium battery. Examples of the lithium battery may include lithium ion batteries, all-solid lithium batteries, lithium-air batteries, lithium metal batteries, and the like. Examples of the lithium battery may include primary batteries or secondary batteries. For example, the lithium battery may be a lithium secondary battery.

The positive electrode and the electrochemical device may have high energy density and enhanced high-rate and lifespan characteristics.

An electrolyte may be filled in the holes or cracks of the sintered plate electrode active material layer of the positive electrode. The electrolyte may be filled in the entire or a part of the holes or cracks of the sintered plate electrode active material layer of the positive electrode.

The electrolyte may include a liquid electrolyte, a solid electrolyte, or a gel electrolyte.

The liquid electrolyte includes a lithium salt and an organic solvent. The lithium salt is a material that is soluble in the organic solvent and serves as a source of lithium ions in a battery enabling basic operation of the lithium secondary battery. Any suitable lithium salts may be used. For example, the lithium salt may be $LiPF_6$, $LiBF_4$, $LiSbF_6$, $LiAsF_6$, $LiSbF_6$, $LiCF_3SO_3$, $Li(CF_3SO_2)_3C$, $Li(CF_3SO_2)_2N$, $LiC_4F_9SO_3$, $LiClO_4$, $LiAlO_4$, $LiAlCl_4$, $LiAlF_4$, $LiBPh_4$, $LiB_{10}Cl_{10}$, $C_4F_3SO_3Li$, $LiN(C_xF_{2x+1}SO_2)(C_yF_{2y+1}SO_2)$ (where x and y are positive integers), $CF_3CO_2Li$, LiCl, LiBr, LiI, lithium bis(oxalate) borate ("LiBOB"), a lower aliphatic lithium carboxylate, lithium tetraphenyl borate, lithium imide, or a combination thereof. The lithium salt may be used as a supporting electrolytic salt. A concentration of the lithium salt may be within a suitable range and an amount of the lithium salt may be in the range of, for example, 0.1 moles per liter (molar (M)) to 2.0 M in the electrolyte to obtain desirable performance of the lithium secondary battery. When the concentration of the lithium salt is within the disclosed range, the electrolyte may have appropriate conductivity and viscosity to enhance the performance of the electrolyte, and mobility of lithium ions may be improved. The electrolyte may further include other additives to further enhance cycle characteristics by forming stable solid electrolyte interphase ("SEI") or coating on the surface of the electrode. The additives may be, for example, tris(trimethylsilyl) phosphate ("TMSPa"), lithium difluorooxalatoborate ("LiFOB"), vinylene carbonate ("VC"), propanesultone (PS), succinonitrile ("SN"), $LiBF_4$, for example, a silane compound having a functional group capable of forming a siloxane bond such as an acryl, amino, epoxy, methoxy, ethoxy, or vinyl group, and a silazane compound such as hexamethyl disilazane. These additives may be added alone or in combination of at least two thereof. The additives may be included therein in an amount of about 0.01 weight percent (wt %) to about 10 wt %, based on a total weight of the organic solvent. For example, the additive may be included in an amount of about 0.05 wt % to about 10 wt %, about 0.1 wt % to about 5 wt %, or about 0.5 wt % to about 4 wt %, based on the total weight of the organic solvent. However, the amount of the additive is not particularly limited; the additive should not considerably reduce the effects on increasing the capacity retention ratio of the lithium secondary battery by using the electrolyte.

The solid electrolyte may be an organic solid electrolyte or an inorganic solid electrolyte. Examples of the organic solid electrolyte may include polyethylene derivatives, polyethylene oxide derivatives, polypropylene oxide derivatives, phosphoric acid ester polymers, poly lysine, polyester sulfide, polyvinyl alcohol, polyvinylidene fluoride, and polymers containing ionic dissociation groups. Examples of the inorganic solid electrolyte may include a nitride, halide, or sulfate of Li such as $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

The gel electrolyte may include a polymer electrolyte and a lithium salt. If desired, the gel electrolyte may further include an ionic liquid or an additive. The polymer electrolyte may include a lithium-ion conductive compound. The lithium salt may be the disclosed lithium salt.

The negative electrode may include a carbonaceous material, a transition metal oxide, a non-transition metal oxide, lithium metal, a metal alloyable with lithium, or a combination thereof. The carbonaceous material may be crystalline carbon, amorphous carbon, or a combination thereof. The crystalline carbon may be graphite such as natural graphite or artificial graphite that are in amorphous, plate, flake, spherical, or fibrous form, and the amorphous carbon may be soft carbon (carbon sintered at low temperature) or hard carbon, mesophase pitch carbide, sintered coke, or the like. Examples of the transition metal oxide may include lithium titanium oxide, vanadium oxide, and lithium vanadium oxide. Examples of the non-transition metal oxide may include $SnO_2$ and $SiO_x$ (where $0<x<2$). Examples of the metal alloyable with lithium may include Si, Sn, Al, Ge, Pb, Bi, Sb, Si—Y' alloy (where Y' is alkali metal, alkali earth metal, a Group 13 element, a Group 14 element, transition metal, a rare earth element, or a combination thereof, except for Si), Sn—Y' alloy (where Y' is alkali metal, alkali earth metal, a Group 13 element, a Group 14 element, transition metal, a rare earth element, or a combination hereof, except for Sn). The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The negative electrode may be prepared as follows. For example, a negative active material, a binder, and a solvent, and optionally, a conductive material, are mixed to prepare a negative electrode slurry composition, and the negative electrode slurry composition is directly coated on a negative current collector to prepare a negative electrode plate. The negative electrode slurry composition is cast on a separate support and a negative active material film separated from the support is laminated on a negative current collector to prepare a negative electrode plate.

The negative current collector may have a thickness of about 3 μm to about 500 μm, for example, about 3.5 μm to about 250 μm, about 4 μm to about 125 μm, about 4.5 μm to about 100 μm, about 5 μm to about 75 μm, or about 5.5 μm to about 50 μm. The negative current collector is not particularly limited and the current collector should not cause chemical change in a fabricated electrochemical device and should have high conductivity. For example, copper, stainless-steel, aluminum, nickel, titanium, calcined carbon, copper or stainless-steel surface-treated with carbon, nickel, titanium silver, or an aluminum-cadmium alloy may be used therefor. In addition, the current collector may be processed to have irregularities on the surface thereof to enhance adhesiveness thereof to the negative active material layer and may be used in any of various suitable forms including films, sheets, foils, nets, porous structures, foams, and non-woven fabrics.

The electrochemical device may further include a separator. The positive electrode may be separated from the negative electrode by the separator, and the separator may be formed of any suitable material. For example, any suitable separator having low resistance to ion migration of the electrolyte and excellent electrolyte-retaining ability may be used. For example, the separator may include glass fiber, polyester, polyethylene, polypropylene, polytetrafluoroethylene ("PTFE"), or a combination thereof, each of which is a non-woven or woven fabric. The separator may have a pore diameter of about 0.01 μm to about 10 μm and a thickness of about 5 μm to about 300 μm.

For example, the lithium secondary battery may be prepared by winding or folding a structure including the positive electrode, the separator, and the negative electrode and accommodating the structure in a battery case. Then, an organic electrolytic solution is injected into the battery case and the battery case is sealed by a sealing member, thereby completing the manufacture of the lithium secondary battery. The battery case may have a cylindrical shape, a rectangular shape, or a thin-film shape. For example, the lithium secondary battery may be a large-sized thin film battery. The lithium secondary battery may be, for example, a lithium ion battery.

The separator may be between the positive electrode and the negative electrode to prepare a battery assembly. The battery assembly may be stacked in a bi-cell structure and impregnated with an organic electrolyte, and then the resultant is accommodated in a pouch and sealed to complete the manufacture of a lithium ion polymer battery.

In addition, a plurality of battery assemblies may be stacked to form a battery pack, which may be used in any suitable high capacity and high output device for which high capacity and high output is desired. For example, the battery pack may be used in laptop computers, smartphones, electric tools, electric vehicles, and the like.

An operation voltage of the electrochemical device, e.g., a lithium secondary battery, may be about 4.0 volts (V) or greater, for example, about 4.05 V to about 20 V, about 4.1 V to about 19 V, about 4.15 V to about 18 V, about 4.2 V to about 17 V, or about 4.25 V to about 16 V.

Method of Preparing Electrode Structure

A method of preparing an electrode structure according to an embodiment includes: providing an electrode active material composition; coating the electrode active material composition on a substrate; heating the electrode active material composition to prepare an electrode active material layer; forming an opening, e.g., a hole or crack, penetrating through the electrode active material layer, e.g., sintered plate electrode active material layer; coating a conductive bonding layer composition on the current collector to form a coated current collector; and press-bonding the sintered plate electrode active material layer to the coated current collector to prepare a press-bonded structure including a conductive bonding layer between the current collector and the electrode active material layer and form a conductive layer on an inner surface of the opening; and annealing the press-bonded structure to prepare the electrode structure.

The content of the conductive material and the binder is at most 0.01% by weight on the basis of the total weight of the electrode active material layer in at least 90% of the electrode active material area that is not adjacent to the conductive layer. The content of the conductive material and the binder is at most 0.01% by weight on the basis of the total weight of the electrode active material layer in at least 91%, 92%, 93%, 94%, 95%, 96%, 97%, 98%, 99%, or 99.9% of the electrode active material area that is not adjacent to the conductive layer.

The solid content of the electrode active material layer may be 25% to 98% by volume. As used herein, "the solid content of the electrode active material layer" refers to a content of an electrode active material. The solid content of the electrode active material layer may be greater than or equal to 25%, 30%, 35%, 40%, 45%, 50%, 55%, 60%, 65%, 70%, 75%, 80%, 85%, 90%, 92%, or 95% A by volume. The solid content of the electrode active material layer may be less than or equal to 98% or 97% by volume.

According to the method of preparing the electrode structure, an electrode structure having high energy density and enhanced high-rate and lifespan characteristics may be provided.

FIG. 2 is a flowchart schematically illustrating a method of preparing an electrode structure according to an embodiment.

As shown in FIG. 2, the method of preparing the electrode structure is as follows.

An electrode active material composition is coated on a substrate and the coated composition is heated to prepare a sintered plate electrode active material layer 12 (Step 1). As the substrate, an organic polymer plate such as polyethylene terephthalate or a conveying belt may be used. The electrode active material composition may include powder of a lithium transition metal oxide. The electrode active material composition may be a slurry prepared by mixing an electrode active material with a dispersing agent, a binder, a plasticizer, a solvent, and the like. Examples of the lithium transition metal oxide may include $LiCoO_2$, $Li(Ni_bCo_cMn_d)O_2$ (where $0<b\leq0.9$, $0<c\leq0.5$, $0<d\leq0.5$, and $b+c+d=1$), $Li(Ni_bCo_cAl_e)O_2$ (where $0<b\leq0.9$, $0<c\leq0.5$, $0<e\leq0.1$, and $b+c+e=1$), $LiMn_2O_4$, or $LiFePO_4$. Examples of the dispersing agent may include toluene, isopropanol, or NMP. Examples of the binder may include polyvinylidene fluoride and polyvinyl butyral. Examples of the plasticizer may include di(2-ethylhexyl)phthalate. Examples of the solvent may include NMP. However, the embodiment is not limited thereto, and any suitable lithium transition metal oxides, dispersing agents, binders, plasticizers, and solvents may be used. The electrode active material composition may be coated by doctor blading, tape casting, or the like. The sintered plate electrode active material layer 12 is prepared by coating the electrode active material composition having a viscosity of about 400 centipoise (cP) to about 5,000 cP on the substrate and heating the coated composition in a furnace at a temperature of about 700° C. to about 1,500° C., for example, about 750° C. to about 1,450° C., about 800° C. to about 1,400° C., about 850° C. to about 1,350° C., about 900° C. to about 1,300° C., or about 950° C. to about 1,250° C., for about 1 hour to about 20 hours, for example, about 65 minutes to about 18 hours, about 70 minutes to about 16 hours, about 75 minutes to about 14 hours, about 80 minutes to about 12 hours, or about 85 minutes to about 10 hours. Before the heating, the coated electrode active material composition may be subjected to a deformation process under a reduced pressure.

At least one hole 13 or crack penetrating the sintered plate electrode active material layer 12 from one surface to the other surface may be formed (Step 2). The penetrating hole 13 or crack may be formed by laser drilling. The hole 13 or crack may be formed to vertically penetrate the sintered plate electrode active material layer 12 from one surface to the other surface thereof. An area of the penetrating hole 13 or crack may be about 1% to about 10% of a total area of the sintered plate electrode active material layer 12. A size of the hole 13 or crack may be from about 0.1 nm to about 200 μm, for example, about 0.2 μm to about 150 μm, about 0.5 μm to about 125 μm, about 1 μm to about 100 μm, about 5 μm to about 75 μm, or about 10 μm to about 50 μm. The size of the hole 13 or crack may have a different meaning according to the shape of a cross-section of the particle, e.g., the "diameter" for a "circular" cross-section, the "length of major axis" for an "oval" cross-section, the "length of a longest side" for a "rectangular" cross-section, and the "length of one side" for a "pentagonal, hexagonal, etc." cross-section.

A conductive bonding layer-forming composition maybe coated on a current collector 11. The current collector 11 may have a thickness of about 3 μm to about 500 μm, for example, about 4 μm to about 200 μm, about 5 μm to about 100 μm, about 6 μm to about 50 μm, about 7 μm to about 25 μm, or about 8 μm to about 20 μm. Examples of the current collector 11 may include copper, stainless-steel, aluminum, nickel, titanium, calcined carbon, copper or stainless-steel surface-treated with carbon, nickel, titanium, silver, or an aluminum-cadmium alloy. The conductive bonding layer 14 may be formed of a composition including a conductive material and a binder. A weight ratio of the conductive material to the binder may be in the range of about 4:9 to about 11:3, for example, about 4:8 to about 10:3, about 4:7 to about 9:3, or about 4:6 to about 8:3. When the weight ratio of the conductive material to the binder is within the disclosed range, the conductive bonding layer 14 may be uniformly coated. The conductive material may include a carbonaceous material, a metallic material, a metal oxide material, or a combination thereof. Examples of the conductive material may include carbon particles, carbon fibers, or carbon tubes such as carbon black, natural graphite, artificial graphite, acetylene black, or ketjen black; metal particles, metal fibers, metal tubes, metal oxide particles, metal oxide fibers, or metal oxide tubes of copper, nickel, aluminum, cobalt, chromium, palladium, molybdenum, silver, gold, thallium, tungsten, iron, titanium, platinum, an oxide thereof, or a combination thereof; or a combination thereof. Examples of the binder may include vinylidene fluoride/hexafluoropropylene copolymer, polyvinylidene fluoride, polyacrylonitrile, polymethylmethacrylate, polytetrafluoroethylene ("PTFE"), polyamideimide, styrene butadiene, or a combination thereof. The conductive bonding layer 14 may have a thickness of 0.1 about nm to about 20 μm, for example, about 0.2 nm to about 19 μm, about 0.4 nm to about 18 μm, about 0.6 nm to about 17 μm, about 0.8 nm to about 16 μm, or about 1 nm to about 15 μm.

The sintered plate electrode active material layer 12 is press-bonded to the current collector 11 coated with the conductive bonding layer-forming composition (Step 3). In the press-bonding, a pressure is applied by using a press. The conductive bonding layer-forming composition is pressed to be raised upward along the inner wall of the hole 13 or crack of the sintered plate electrode active material layer 12, thereby forming a conductive thin-film layer 15 with the conductive bonding layer-forming composition. The conductive thin-film layer 15 may have a thickness of about 0.1 nm to about 10 μm, for example, about 0.5 nm to about 8 μm, about 1 nm to about 6 μm, about 25 nm to about 4 μm, about 50 nm to about 2 μm, or about 100 nm to about 1 μm. The conductive thin-film layer 15 may also be formed of the disclosed conductive bonding layer-forming composition.

The sintered plate electrode active material layer 12 is cleaned to remove residue present on the surface thereof (Step 4). The residue may be removed by wiping using a cleansing solution.

The press-bonded current collector 11 and sintered plate electrode active material layer 12 is annealed to prepare the disclosed electrode structure in which the conductive bonding layer 14 is between the current collector 11 and the sintered plate electrode active material layer 12 and the conductive thin-film layer 15 is formed on the inner surface of the hole 13 or crack (Step 5). The annealing may be performed in a vacuum oven at a temperature of about 60° C. to about 200° C., for example, about 70° C. to about 190° C., about 80° C. to about 180° C., about 90° C. to about 170° C., about 100° C. to about 160° C., about 110° C. to about 150° C., for about 40 minutes to about 200 minutes, for example, about 50 minutes to about 190 minutes, about 60 minutes to about 180 minutes, about 70 minutes to about 170 minutes, about 80 minutes to about 160 minutes, or about 90 minutes to about 150 minutes.

Hereinafter, the present disclosure will be described in more detail with reference to the following examples and comparative examples. However, the following examples are merely presented to exemplify the present invention, and the scope of the present invention is not limited thereto.

EXAMPLES

Preparation of Positive Electrode

Example 1: Preparation of Positive Electrode

A slurry prepared by mixing $LiCoO_2$ powder, polyvinyl butyral, bis(2-ethylhexyl)phthalate (bis(2-ethylhexyl)phthalate), toluene in a weight ratio of 53:6:1:40 was coated on a conveying belt by doctor blading and annealed in a heating furnace at about 1,025° C. for 2 hours to prepare a sintered plate positive active material layer having a thickness of about 45 micrometers (μm).

A plurality of holes having a diameter of about 30 μm were formed, by laser drilling, to vertically penetrate the upper and lower surfaces of the sintered plate positive active material layer.

Separately, a conductive bonding layer-forming composition prepared by mixing carbon black (Super-P, TIMCAL) as a conductive material and polyamideimide as a binder in a weight ratio of 7:3 was coated, by bar coating, on both surfaces of an Al foil current collector having a thickness of 15 μm.

A conductive thin-film layer was formed by raising the conductive bonding layer-forming composition upward along inner walls of the holes or crack of the sintered plate positive active material layer by press-bonding two sintered plate positive active material layers to both surfaces of the Al foil current collector coated with the conductive bonding layer-forming composition.

Then, residue present on the surfaces of the sintered plate positive active material layers were wiped using a cleaning wiper and the structure was annealed in a vacuum oven at 130° C. for 2 hours to prepare a positive electrode. In this case, a thickness of the conductive bonding layer was about 10 μm, and a thickness of the conductive thin-film layer was about 500 nanometers (nm).

Comparative Example 1: Preparation of Positive Electrode

A slurry prepared by mixing $LiCoO_2$ powder, polyvinyl butyral, bis(2-ethylhexyl)phthalate (bis(2-ethylhexyl)phthalate), toluene in a weight ratio of 53:6:1:40 was coated on a conveying belt by doctor blading and annealed in a heating furnace at about 1,025° C. for 2 hours to prepare a sintered plate positive active material layer having a thickness of about 45 µm.

Two sintered plate positive active material layers were placed on both surfaces of an Al foil current collector having a thickness of 15 µm to prepare a positive electrode.

Comparative Example 2: Preparation of Positive Electrode

A slurry prepared by mixing $LiCoO_2$ powder, polyvinyl butyral, bis(2-ethylhexyl)phthalate (bis(2-ethylhexyl)phthalate), toluene in a weight ratio of 53:6:1:40 was coated on a conveying belt by doctor blading and annealed in a heating furnace at about 1,025° C. for 2 hours to prepare a sintered plate positive active material layer having a thickness of about 45 µm.

Separately, a conductive bonding layer-forming composition prepared by mixing carbon black (Super-P, TIMCAL) as a conductive material and polyamideimide as a binder in a weight ratio of 7:3 was coated, by bar coating, on both surfaces of an Al foil current collector having a thickness of 15 µm and dried at 80° C. for 30 minutes to form a conductive bonding layer having a thickness of about 10 µm.

Two sintered plate positive active material layers were located on both surfaces of the Al foil current collector on which the conductive bonding layer was formed and dried in a vacuum oven at 110° C. for 2 hours to prepare a positive electrode.

Preparation of Lithium Secondary Battery

Example 2: Preparation of Lithium Secondary Battery (Full Cell)

As a negative active material, 97 weight percent (wt %) of graphite powder (MC20, purity of 99.9% or more, Mitsubishi Chemical), 1.5 wt % of styrene-butadiene rubber ("SBR") as a binder, and 1.5 wt % of carboxymethyl cellulose ("CMC") were mixed. The mixture was added to a N-methyl-2-pyrrolidone solvent until a solid content thereof reached 70% and then stirred using a mechanical stirrer for 60 minutes to prepare a negative active material composition. The negative active material composition was coated on both surfaces of a Cu foil current collector having a thickness of 10 µm using a 3-roll coater and dried in a hot-air dryer at 100° C. for 0.5 hours, and then further dried in a vacuum at 120° C. for 4 hours. The resultant was roll-pressed to prepare a negative electrode including the negative active material layer formed on the current collector.

A lithium secondary battery (full cell) was prepared using the positive electrode prepared in Example 1, the negative electrode, polyethylene as a separator, and an electrolyte, which is prepared by dissolving 2.0 moles per liter (molar (M)) $LiPF_6$, as a lithium salt, in a mixed solvent of ethylene carbonate ("EC"), ethyl methyl carbonate ("EMC"), dimethyl carbonate ("DMC"), and fluoroethylene carbonate ("FEC") in a volumetric ratio of 10:5:80:5.

Comparative Examples 3 and 4: Preparation of Lithium Secondary Battery (Full Cell)

Lithium secondary batteries (full cells) were prepared in the same manner as in Example 2, except that the positive electrodes prepared in Comparative Examples 1 and 2 were respectively used instead of the positive electrode prepared in Example 1.

Analysis Example 1: Scanning Electron Microscope ("SEM") Analysis

An SEM analysis was performed on the surface of the sintered plate positive active material layer of the positive electrode prepared in Example 1 and the inner walls of the holes. The SEM analysis was performed using a JEOL JSM-7600F. The results are shown in FIGS. 3A, 3B, and 3C, respectively.

Figure 3A:
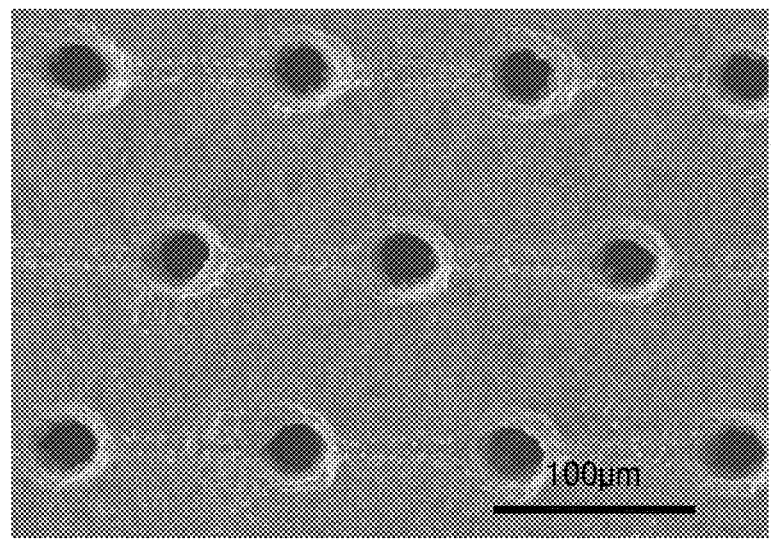
FIG. 3A is a scanning electron microscope ("SEM") image showing a surface of a sintered plate positive active material layer of a positive electrode.
Figure 3B:
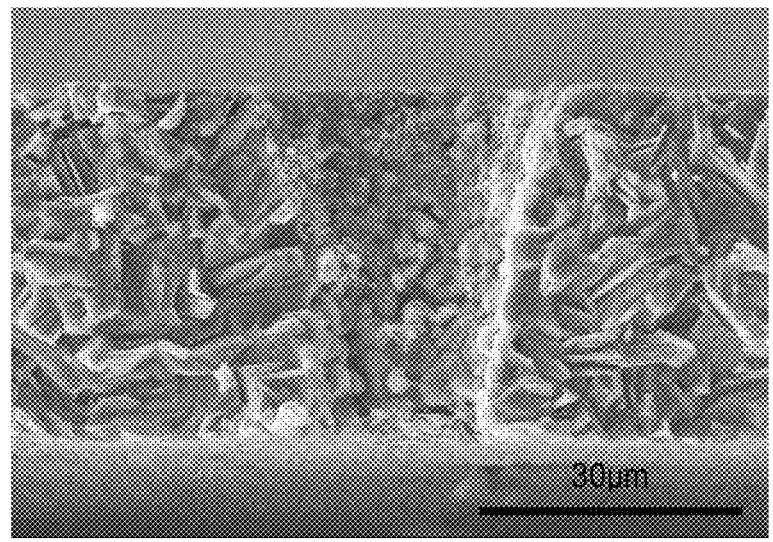
FIG. 3B is an SEM image showing an inner wall of a hole.
Figure 3C:
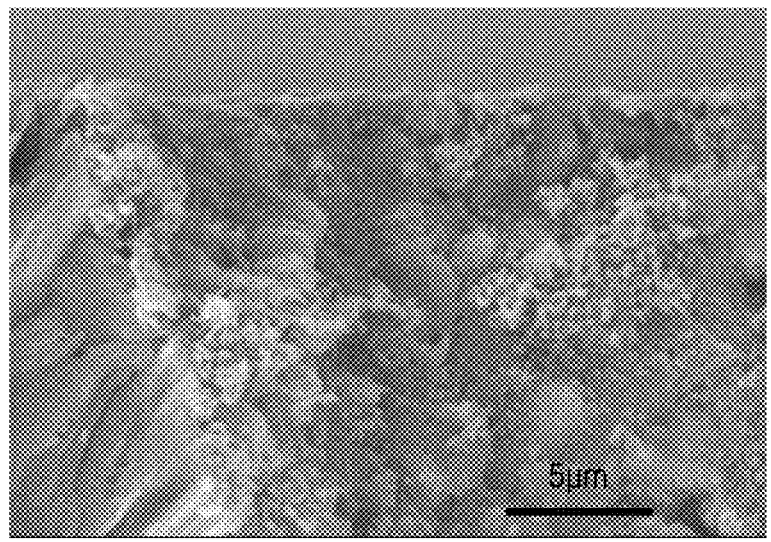
FIG. 3C is an enlarged SEM image of the inner wall of the hole shown in FIG. 3B.

Referring to FIGS. 3A, 3B, and 3C, it is confirmed that a plurality of holes are formed in the sintered plate positive active material layer of the positive electrode prepared in Example 1 and a conductive thin-film layer having a thickness of about 500 nm is formed on the inner walls of the holes.

Evaluation Example 1: Resistivity Test

Four (4) probe tips were linearly aligned at an interval of 1 millimeter (mm) on the surfaces of the positive electrodes respectively prepared in Example 1 and Comparative Example 1 and a current of 100 mA was supplied to an outer probe tip, and resistance (voltage/current) was obtained based on a measured potential difference between an inner probe tip and the outer probe tip. The obtained resistance was multiplied by the thickness (45 µm) of the sintered plate positive active material layer and a correction factor to obtain resistivity values. The results are shown in FIG. 4 and Table 1.

TABLE 1

| Example | Resistivity (kΩ · cm) |
|---|---|
| Example 1 | 0.6 |
| Comparative Example 1 | 1.7 |

Figure 4:
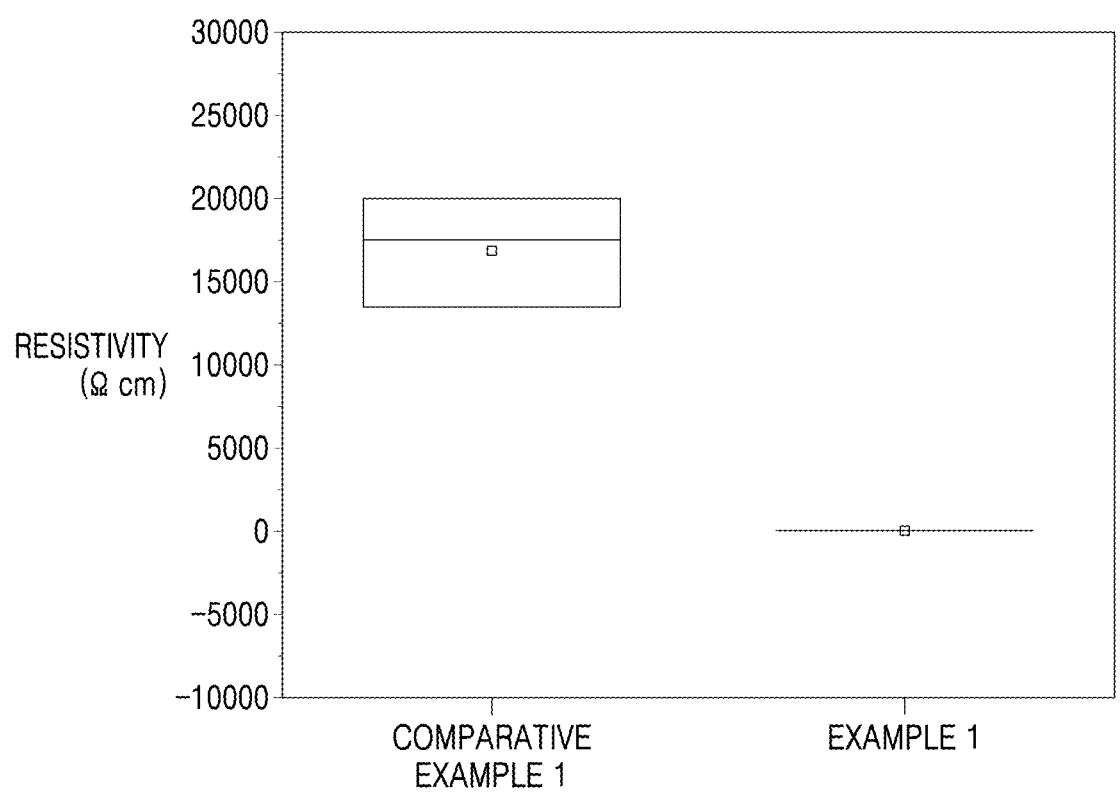
FIG. 4 is a graph showing the resistivity (ohm-centimeter ($\Omega$ cm)) of surfaces of positive electrodes prepared in Example 1 and Comparative Example 1, respectively.

Referring to FIG. 4 and Table 1, the resistivity of the positive electrode prepared in Example 1 was lower than that of the positive electrode prepared in Comparative Example 1. Based thereon, it may be confirmed that the positive electrode prepared in Example 1 has higher electrical conductivity than that of the positive electrode prepared in Comparative Example 1, thereby having reduced resistance. Also, it may be confirmed that the lithium secondary battery including the positive electrode prepared in Example 1 has superior output characteristics than those of the lithium secondary battery including the positive electrode prepared in Comparative Example 1.

Evaluation Example 2: Charging and Discharging Test and SEM

Each of the lithium secondary batteries prepared in Example 2 and Comparative Examples 3 and 4 was charged with a constant current at a 0.1 C rate at room temperature until a voltage reached 4.3 volts (V) (vs. Li/Li$^+$) and then discharged with a constant current at a 0.1 C rate until the voltage reached a cut-off voltage of 3.0 V (vs. Li/Li$^+$) (Formation operation).

Each of the lithium secondary batteries that underwent the formation operation was charged with a constant current at a 0.1 C rate at room temperature until the voltage reached 4.3 V (vs. Li/Li$^+$) and then discharged with a constant current at a 0.1 C rate until the voltage reached 3.0 V (vs. Li/Li$^+$).

Subsequently, the lithium secondary battery was charged with a constant current at a 0.5 C rate until the voltage reached 4.3 V (vs. Li/Li$^+$) and then discharged with a constant current at a 0.5 C rate until the voltage reached 3.0 V (vs. Li/Li$^+$).

Figure 5:
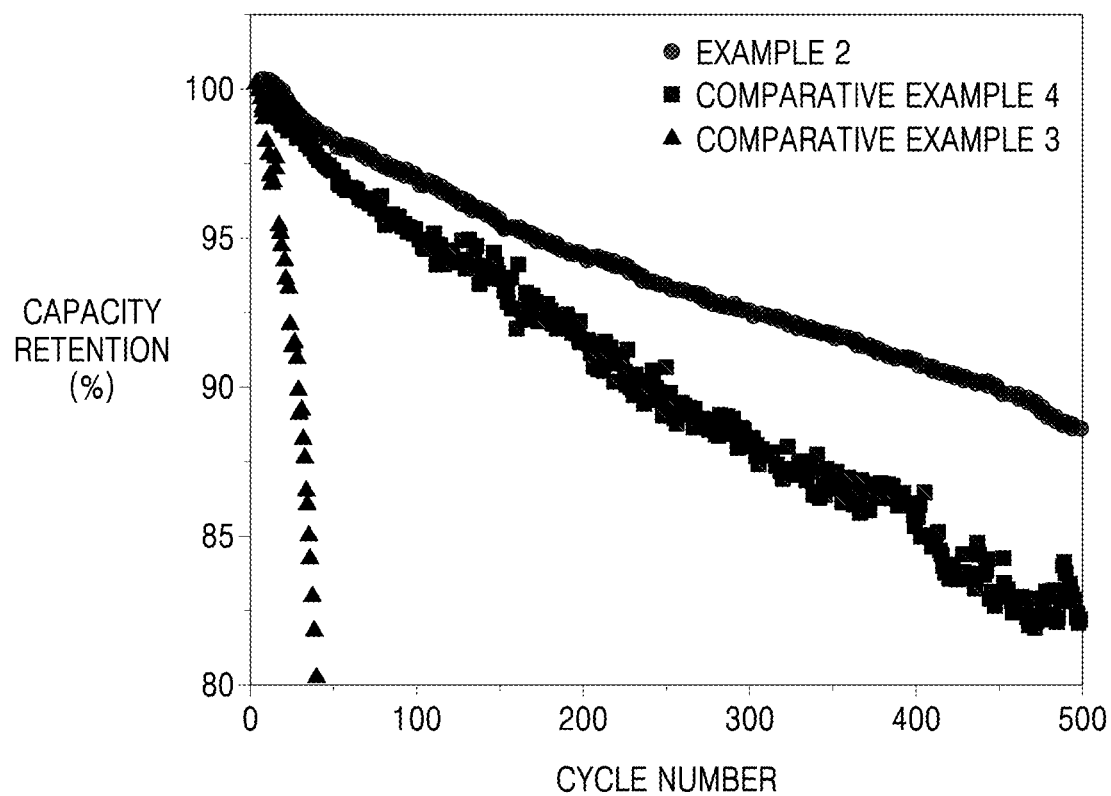
FIG. 5 is a graph of capacity retention (percent (%)) versus cycle number showing results of a charging and discharging test of lithium secondary batteries prepared in Example 2 and Comparative Examples 3 and 4.

Subsequently, the lithium secondary battery was charged with a constant current at a 1.0 C rate until the voltage reached 4.3 V (vs. Li/Li$^+$) and then discharged with a constant current at a 1.0 C rate until the voltage reached 3.0 V (vs. Li/Li$^+$). This process was repeated 500 times. Capacity retention were calculated based on discharge capacities with respect to the number of cycles using Equation 1, and some of the results are shown in FIG. 5 and Table 2.

Capacity retention (%)=(discharge capacity at 500$^{th}$ cycle/discharge capacity at 4$^{th}$ cycle)×100%    Equation 1

TABLE 2

| Example | Capacity retention (%) |
|---|---|
| Example 2 | 88.5 |
| Comparative Example 3 | — |
| Comparative Example 4 | 82.1 |

Referring to FIG. 5 and Table 2, the lithium secondary battery prepared in Example 2 exhibited a higher capacity retention than that of the lithium secondary battery prepared in Comparative Example 4. The lithium secondary battery prepared in Comparative Example 3 failed to proceed to the 50th cycle.

The lithium secondary batteries prepared in Example 2 and Comparative Example 3 were disassembled after the 500th charging and discharging cycle, and the sintered plate positive active material layer of each positive electrode was analyzed by SEM. The SEM analysis was performed using a JEOL JSM-7600F. The results are shown in FIGS. 6A and 6B, respectively.

Figure 6A:
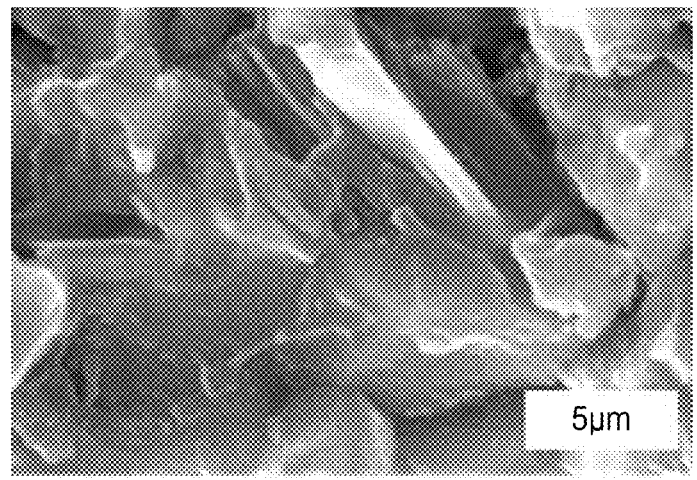
FIG. 6A is an SEM image of a sintered plate positive active material layer of positive electrodes of lithium secondary batteries prepared in Example 2 and disassembled after the 500th cycle of charging and discharging.
Figure 6B:
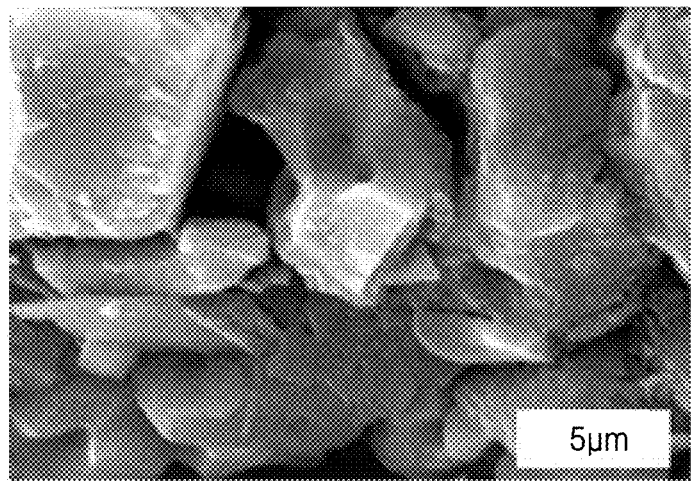
FIG. 6B is an SEM image of a sintered plate positive active material layer of positive electrodes of lithium secondary batteries prepared in Comparative Example 3 and disassembled after the 500th cycle of charging and discharging.

Referring to FIG. 6A, no cracks were observed between grains of the sintered plate positive active material layer of the positive electrode after disassembling the lithium secondary battery prepared in Example 2. Referring to FIG. 6B, a lot of cracks were observed between grains of the sintered plate positive active material layer of the positive electrode after disassembling the lithium secondary battery prepared in Comparative Example 3.

The electrode structure according to an embodiment has a high volume fraction of the electrode active material layer by including the sintered plate electrode active material layer located on at least one surface of the current collector. An electrochemical device including such an electrode structure has a high energy density.

Also, the sintered plate electrode active material layer has at least one, hole, crack, or a combination thereof penetrating the layer from one surface to the other and includes a conductive thin-film layer formed on the inner walls of the hole or crack. An electrochemical device including such an electrode structure may have improved high-rate and lifespan characteristics.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electrode structure comprising:
a current collector; and
an electrode active material layer on a surface of the current collector,
wherein the electrode active material layer comprises an electrode active material and an ordered array of openings penetrating through the electrode active material layer; and
a conductive layer comprising a conductive material and a binder on an inner surface of the openings, and
wherein the content of the conductive material and the binder is 0.05% to 3% by weight on the basis of the total weight of the electrode active material layer,
wherein the openings penetrating through the electrode active material layer do not penetrate the current collector.

2. The electrode structure of claim 1, wherein the content of the conductive material and the binder is at most 0.01% by weight on the basis of the total weight of the electrode active material layer in at least 90% of the electrode active material area that is not adjacent to the conductive layer.

3. The electrode structure of claim 1, wherein a solid content of the electrode active material layer is 25% to 98% by volume.

4. The electrode structure of claim 1, wherein the openings extend in a direction substantially perpendicular to a surface of the electrode active material layer facing the current collector, and
extends from the surface of the electrode active material layer facing the current collector to an opposite surface.

5. The electrode structure of claim 1, wherein the electrode active material layer has a thickness of about 30 micrometers to about 200 micrometers.

6. The electrode structure of claim 1, wherein the electrode active material layer comprises a lithium transition metal oxide.

7. The electrode structure of claim 1, wherein the openings are channels allowing migration of lithium ions.

8. The electrode structure of claim 1, wherein the conductive layer has a thickness of 0.1 nanometers to 10 micrometers.

9. The electrode structure of claim 1, wherein the conductive material comprises a carbonaceous material, a metal, a metal oxide, or a combination thereof.

10. The electrode structure of claim 1, wherein the conductive material comprises:
carbon particles, carbon fibers, carbon tubes, or a combination thereof comprising carbon black, natural graphite, artificial graphite, acetylene black, ketjen black, or a combination thereof;
metal particles, metal fibers, metal tubes, metal oxide particles, metal oxide fibers, or a combination thereof comprising copper, nickel, aluminum, cobalt, chromium, palladium, molybdenum, silver, gold, thallium, tungsten, iron, titanium, platinum, or a combination thereof; or a combination thereof.

11. The electrode structure of claim 1, wherein the binder comprises vinylidene fluoride/hexafluoropropylene copolymer, polyvinylidene fluoride, polyacrylonitrile, polymethylmethacrylate, polytetrafluoroethylene, polyamideimide, styrene butadiene, or a combination thereof.

12. The electrode structure of claim 1, further comprising a conductive bonding layer between the current collector and the electrode active material layer.

13. The electrode structure of claim 12, wherein the conductive bonding layer comprises an electrically conductive material and a binder.

14. The electrode structure of claim 12, wherein the conductive bonding layer has a composition identical to a composition of the conductive layer.

15. A positive electrode comprising the electrode structure of claim 1.

16. An electrochemical device comprising:
the positive electrode according to claim 15;
a negative electrode; and
an electrolyte between the positive electrode and the negative electrode.

17. The electrochemical device of claim 16, wherein the electrolyte is disposed in the openings.

18. The electrochemical device of claim 17, wherein the electrolyte comprises a liquid electrolyte, a solid electrolyte, or a gel electrolyte.

19. The electrochemical device of claim 16, wherein the negative electrode comprises a carbonaceous material, a transition metal oxide, a non-transition metal oxide, lithium metal, a metal alloyable with lithium, or a combination thereof.

20. The electrochemical device of claim 16, further comprising a separator.

21. The electrochemical device of claim 16, wherein an operating voltage of the electrochemical device is 4 volts or higher.

22. A method of preparing an electrode structure, the method comprising:
providing an electrode active material composition;
coating the electrode active material composition on a substrate;
heating the electrode active material composition to prepare an electrode active material layer;
forming an ordered array of openings penetrating through the electrode active material layer;
coating a conductive bonding layer composition on a current collector to form a coated current collector; and
press-bonding the electrode active material layer to the coated current collector to prepare a press-bonded structure comprising a conductive bonding layer between the current collector and the electrode active material layer and form a conductive layer on an inner surface of the openings; and
annealing the press-bonded structure to prepare the electrode structure of claim 1.

23. The method of 22, wherein the content of the conductive material and the binder is at most 0.01% by weight on the basis of the total weight of the electrode active material layer in at least 90% of the electrode active material area that is not adjacent to the conductive layer.

24. The method of 22, wherein a solid content of the electrode active material layer is 25% to 98% by volume.

25. The method of claim 22, wherein the press-bonding comprises pressing-bonding the electrode active material layer to the current collector such that the conductive bonding layer composition coated on the current collector spreads onto the inner surface of the openings.

26. The method of claim 22, wherein the electrode active material composition comprises a lithium transition metal oxide.

27. The method of claim 22, wherein the each opening has a size of 0.1 nanometers to 200 micrometers.

28. The method of claim 22, wherein the conductive bonding layer composition and the conductive layer comprise a conductive material and a binder.

29. The method of claim 22, wherein a weight ratio of the conductive material to the binder is from 4:6 to 7:3.

30. The method of claim 22, wherein the conductive bonding layer has a thickness of 0.1 nanometers to 20 micrometers.

31. The method of claim 22, wherein the conductive layer has a thickness of 0.1 nanometers to 10 micrometers.

32. The method of claim 22, further comprising, between the press-bonding and the annealing, cleaning an exposed surface of the electrode active material layer to remove a residue remaining on the exposed surface.

33. An electrode structure comprising:
a current collector; and
an electrode active material layer comprising a lithium transition metal oxide and having a thickness of about 35 micrometers to about 50 micrometers on a surface of the current collector, wherein the electrode active material layer comprises an ordered array of openings penetrating through the electrode active material layer, and wherein each opening has a size of about 10 micrometers to about 50 micrometers;
a conductive layer having a thickness of about 100 nanometers to about 1 micrometer on a surface of the openings; and
a conductive bonding layer between the current collector and the electrode active material layer, wherein the conductive bonding layer has a composition identical to a composition of the conductive layer,
wherein the openings penetrating through the electrode active material layer does not penetrate the current collector.

* * * * *